(12) United States Patent
Yasumoto et al.

(10) Patent No.: US 8,618,215 B2
(45) Date of Patent: Dec. 31, 2013

(54) MODIFIED POLYPROPYLENE-BASED POLYMER AND COMPOSITION COMPRISING IT

(75) Inventors: Kazuhisa Yasumoto, Kawasaki (JP); Tomohiro Mochida, Kawasaki (JP)

(73) Assignee: Sunallomer Ltd., Tokyo (JP)

( * ) Notice: Subject to any disclaimer, the term of this patent is extended or adjusted under 35 U.S.C. 154(b) by 0 days.

(21) Appl. No.: 12/162,668

(22) PCT Filed: Jan. 19, 2007

(86) PCT No.: PCT/JP2007/051209
§ 371 (c)(1),
(2), (4) Date: Jul. 30, 2008

(87) PCT Pub. No.: WO2007/088776
PCT Pub. Date: Aug. 9, 2007

(65) Prior Publication Data
US 2009/0005485 A1    Jan. 1, 2009

(30) Foreign Application Priority Data

Feb. 3, 2006   (JP) ................. 2006-027415

(51) Int. Cl.
C08L 51/00   (2006.01)
C08L 51/06   (2006.01)
C08F 255/02  (2006.01)
C08F 255/04  (2006.01)

(52) U.S. Cl.
USPC ............ 525/70; 525/71; 525/240; 525/263; 525/298; 525/301

(58) Field of Classification Search
USPC ......... 525/191, 192, 193, 240, 242, 263, 298, 525/301, 70, 71
See application file for complete search history.

(56) References Cited

U.S. PATENT DOCUMENTS

| | | | |
|---|---|---|---|
| 4,751,270 A * | 6/1988 | Urawa et al. .......... | 525/244 |
| 5,286,564 A | 2/1994 | Cecchin et al. | |
| 5,552,482 A * | 9/1996 | Berta ................. | 525/88 |
| 5,698,617 A | 12/1997 | Marzola et al. | |
| 6,569,950 B2 | 5/2003 | Kitano et al. | |
| 7,201,970 B2 * | 4/2007 | Kanamori et al. ........ | 428/523 |
| 2002/0161131 A1 | 10/2002 | Kitano et al. | |
| 2004/0034166 A1 | 2/2004 | Botros | |
| 2008/0300342 A1 * | 12/2008 | Kodama et al. ........... | 523/209 |

FOREIGN PATENT DOCUMENTS

| | | |
|---|---|---|
| CN | 1235175 A | 11/1999 |
| CN | 1373145 A | 10/2002 |
| CN | 1541248 A | 10/2004 |
| JP | 04-132711 A | 5/1992 |
| JP | 06-025367 A | 2/1994 |
| JP | 06-049281 A | 2/1994 |
| JP | 2002-256023 A | 9/2002 |
| JP | 2004-238438 A | 8/2004 |
| WO | 03/076509 A1 | 9/2003 |
| WO | WO-03092018 A1 * | 11/2003 |
| WO | WO 2005103138 A1 * | 11/2005 |

OTHER PUBLICATIONS

Chiang et al.; "The Improvements in Flame Retardance and Mechanical Properties of Polypropylene/FR Blends by Acrylic Acid Graft Copolymerization"; European Polymer Journal; Mar. 1, 1996; pp. 385-390; vol. 32, No. 3; Pergamon Press, Ltd., Oxford, GB.
Chiang et al.; "Effect of Matrix Graft Modification Using Acrylic Acid on the PP/Mg(OH)$_2$ Composites and its Possible Mechanism"; Journal of Polymer Research; Mar. 1, 2000; pp. 15-20; vol. 7, No. 1; Kluwer Academic Publishers-Consultants Bureau, NL.

* cited by examiner

*Primary Examiner* — Irina S Zemel
*Assistant Examiner* — Jeffrey Lenihan
(74) *Attorney, Agent, or Firm* — Sughrue Mion, PLLC

(57) ABSTRACT

A modified polypropylene-based polymer obtained by graft modification of a propylene/α-olefin copolymer with a xylene-soluble portion of at least 40 mass % and no greater than 85 mass %, a xylene-soluble portion (XS) intrinsic viscosity (XSIV) of at least 2.5 dl/g, and an MFR value of no greater than 3.0 g/10 min at 230° C. under a load of 2.16 kg, using an unsaturated carboxylic acid or its derivative, and a flame retardant polyolefin-based resin composition having prescribed contents of a polyolefin-based resin component comprising 60-95 mass % of a polyolefin-based resin and 40-5 mass % of a modified polypropylene-based polymer, and an inorganic flame retardant component comprising an inorganic filler.

4 Claims, 1 Drawing Sheet

MODIFIED POLYPROPYLENE-BASED POLYMER AND COMPOSITION COMPRISING IT

TECHNICAL FIELD

The present invention relates to a modified polypropylene-based polymer and to a composition comprising it. In particular, the invention relates to a modified polypropylene-based polymer with excellent adhesive force onto various base materials, with affinity for various fillers such as inorganic fillers or flame retardants and with excellent performance as an adhesive or compatibilizer, as well as to a resin composition comprising it, wherein the composition is used either alone or in the form of a laminate as a molded article such as a packaging material or container, as a modifier for a filling material or as a compatibilizer for automobile materials, or in the field of household electrical appliances or electrical wiring.

BACKGROUND ART

Polypropylene (PP)-based resins are generally inexpensive and have excellent mechanical strength, thermostability, chemical resistance, molding workability and recycling properties, and are therefore used in a wide range of fields including industrial materials, automobile parts, household electrical appliances and packaging materials. In recent years it has become a goal to provide products exhibiting a high level of performance in terms of flame retardance, gas barrier properties, thermostability and rigidity that cannot be realized by PP alone, by using combinations thereof with other materials. However, since PP does not have polar groups in the molecule, it exhibits very low adhesive strength for other materials such as other types of resins or metal, wood and the like, and in some cases it fails to adhere at all. One well-known means for solving this problem is a technique of blending crystalline polypropylene with maleic acid and a radical initiator for graft modification, as described in Japanese Examined Patent Publication No. 42-10757, for example. However, the molecular chains of crystalline polypropylene are easily cleaved by the radical initiator, such that the flow property is notably increased while the adhesion interface becomes rigid, and therefore this technique is poorly applicable for uses that require flexibility. Flexible adhesives or compatibilizers have also been proposed which are resin materials obtained by modifying ethylene/α-olefin copolymer rubber with unsaturated carboxylic acids, as disclosed in Japanese Unexamined Patent Publication No. 52-49289, but because such materials are composed primarily of ethylene, they have insufficient heat resistance and compatibility with PP. In addition, Japanese Unexamined Patent Publication No. 55-50040, Japanese Unexamined Patent Publication SHO No. 56-159239 and Japanese Unexamined Patent Publication No. 09-235319 propose materials obtained by modifying PP and rubber blends with maleic acid, but these materials are still problematic because of inadequate tensile strength or adhesive force with the filler due to a lack of dispersibility of the rubber.

DISCLOSURE OF THE INVENTION

The present invention has been accomplished in light of these circumstances, and one of its objects is to provide a material that realizes flexibility and heat resistance as well as affinity and high adhesive strength at interfaces between other base materials or fillers, compared to conventional modified polyolefin materials, and that when added alone or as one component of a composition, can be utilized as an adhesive in fields of packaging materials such as films, while also exhibiting a function as a compatibilizer to provide excellent physical properties such as tensile elongation and abrasion resistance when combined with other materials.

As a result of much diligent research directed toward solving the problems described above, the present inventors have discovered that a modified polypropylene-based polymer obtained by graft modification of a polypropylene-based copolymer having a specific composition exhibits excellent adhesive strength and resin improvement as well as a notable effect as a compatibilizer, and the invention has been completed upon this discovery.

The invention therefore provides the following modified polypropylene-based polymer and flame retardant polyolefin-based resin composition.

(1) A modified polypropylene-based polymer obtained by graft modification of a propylene/α-olefin copolymer with a xylene-soluble portion of at least 40 mass % and no greater than 85 mass %, a xylene-soluble portion (XS) intrinsic viscosity (XSIV) of at least 2.5 dl/g, and an MFR value of no greater than 3.0 g/10 min at 230° C. under a load of 2.16 kg, using an unsaturated carboxylic acid or its derivative.

(2) A modified polypropylene-based polymer according to (1) above, wherein a dialkyl peroxide with a half-life temperature of at least 170° C. is used as the radical initiator for graft modification.

(3) A modified polypropylene-based polymer according to (1) or (2) above, wherein the propylene/α-olefin copolymer is polymerized by a multistage polymerization process.

(4) A flame retardant polyolefin-based resin composition which is a composition comprising a polyolefin-based resin component (a) and an inorganic flame retardant component (b), wherein component (a) comprises 60-95 mass % of a polyolefin-based resin (a-1) and 40-5 mass % of a modified polypropylene-based polymer (a-2) according to any one of (1) to (3) above, component (b) comprises an inorganic metal hydrate and/or an inorganic filler, and the amount of component (b) is at least 50 parts by mass and no greater than 250 parts by mass with respect to 100 parts by mass of component (a).

Incidentally, the composition of (4) above is merely a preferred example of a composition employing the modified polypropylene-based polymer of the invention as described in (1) to (3) above, and it is implicitly understood that use of the polymer of the invention is not limited only to that example.

The invention provides a modified polypropylene-based polymer with excellent adhesive force onto various base materials, with affinity for various fillers such as inorganic fillers or flame retardants and with excellent performance as an adhesive or compatibilizer, and a resin composition comprising it may be used either alone or in the form of a laminate as a molded article such as a wrapping material or container, or as a modifier for a filling material, as a compatibilizer for automobile materials or in the field of household electrical appliances or electrical wiring.

BEST MODE FOR CARRYING OUT THE INVENTION

Figure 1:
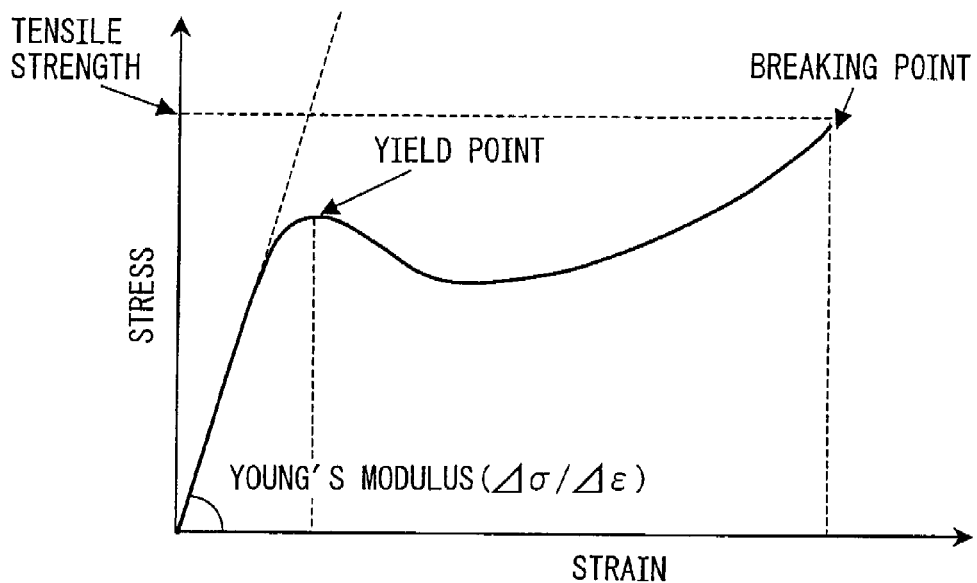
FIG. 1 is a stress-strain curve for the tensile test of the examples.

Preferred modes of the invention will now be explained, with the understanding that the invention is not limited to these modes and that various modifications may be implemented such as are within the spirit and scope of the invention.

According to the invention, the "propylene/α-olefin copolymer" is composed of one or more resin components selected from among random copolymers and block copolymers of propylene and α-olefins other than propylene, where such copolymers may also include homopolymers of propylene. Here, an α-olefin other than propylene means a C2-12 α-olefin other than propylene, and as examples there may be mentioned ethylene, butene-1, 4-methylpentene-1, hexene-1 and octene-1.

Specific examples of propylene/α-olefin copolymers are not limited to these, and for example, there may also be mentioned propylene/α-olefin copolymers containing at least 40 mass % and no greater than 85 mass % of a xylene-soluble portion (elastomer component), produced by a multistage polymerization process as disclosed in Japanese Unexamined Patent Publication HEI No. 6-25367, for example.

The multistage polymerization process referred to here is a process of polymerization by two or more stages of polymerization. Specifically, for example, it is a polymerization process consisting of a first step of producing a first-stage propylene homopolymer or crystalline random copolymer of propylene with no greater than 5 mass % of an α-olefin other than propylene, and a second step of producing a random copolymer elastomer of ethylene with one or more C3 or greater α-olefins. If the resin components produced in each stage are blended in a reactor during polymerization, the resin obtained by the polymerization process can have the ethylene/α-olefin random copolymer elastomer component produced in the second stage finely dispersed in the crystalline propylene resin produced in the first stage, unlike in conventional processes in which the two components are mechanically blended. The elastomer component preferably has a mean particle size of no greater than 5 μm, without an apparent sea-island dispersed structure but with an inter penetrating polymer network structure. More preferably, the elastomer component is dispersed in the copolymer with a mean particle size of no greater than 1 μm.

Dispersion of the high molecular weight elastomer component on the micron order in this manner is effective for improving the adhesive force, filler dispersibility, low-temperature characteristics and abrasion resistance when it functions as an adhesive or compatibilizer after graft modification.

The elastomer component is preferably an ethylene/propylene random copolymer or an ethylene/butene random copolymer. The ethylene content of the elastomer component is preferably at least about 15 mass % and no greater than 70 mass % and more preferably at least 20 mass % and no greater than 60 mass %, in order to reduce the particle size. If it is less than 15 mass % or greater than 70 mass %, the elastomer particle size may be too large.

The propylene/α-olefin copolymer produced by such a multistage polymerization process preferably has a xylene-soluble portion (corresponding to the elastomer component) of at least 40 mass % and no greater than 85 mass % and more preferably at least 50 mass % and no greater than 80 mass %. If the xylene-soluble portion is below 40 mass %, the dispersibility of the inorganic flame retardant in the copolymer and the flexibility and low-temperature characteristics of the copolymer may be insufficient, while if it is above 85 mass %, the mechanical strength of the copolymer may be reduced and handling of the copolymer during compounding may be difficult due to deterioration in the powder quality.

For measurement of the xylene-soluble portion, 2.5 g of resin is dissolved in 250 ml of xylene at 135° C. while stirring. After 20 minutes, the solution is cooled to 25° C. while stirring and then allowed to settle for 30 minutes. The precipitate is filtered out and the filtrate is evaporated under a nitrogen stream, while the residue is vacuum dried at 80° C. to a constant mass. The residue is weighed out and the weight percentage of the xylene-soluble components at 25° C. is determined.

The intrinsic viscosity of the xylene-soluble portion (XSIV) is measured in tetralin at 135° C. using the previously separated xylene-soluble portion (XS). If the xylene-soluble portion intrinsic viscosity (XSIV) measured in tetralin at 135° C. is less than 2.5 dl/g, the MFR will drastically increase during graft modification, impairing the function as a compatibilizer. On the other hand, if the XSIV is greater than 7.0 dl/g, the flow property of the propylene/α-olefin copolymer will be reduced and may substantially hamper production.

Similarly, the propylene/α-olefin copolymer preferably has a melt flow rate (MFR) of no greater than 3.0 g/10 min at 230° C. under a load of 2.16 kg. If the MFR value is greater than 3.0 g/10 min, the MFR after graft modification will drastically increase, impairing the function as a compatibilizer.

The graft modification according to the invention may be carried out by a melting process in which the propylene/α-olefin copolymer and the unsaturated carboxylic acid or its derivative are reacted in a kneader or extruder in the presence of a radical initiator, or a solution process in which the unsaturated carboxylic acid or its derivative and a radical initiator are added dropwise to a solution of the propylene/α-olefin copolymer or an organic solvent solution of the copolymer in an autoclave and reacted while stirring. A solution process is more advantageous for increasing the graft modification rate, but a melting process which allows continuous industrial production is more advantageous in terms of production cost.

The radical initiator used is preferably an organic peroxide, of which preferred examples include hydroxyperoxides, dialkyl peroxides, diisopropylbenzene hydroperoxide, dipropionyl peroxide, dioctanoyl peroxide, benzoyl peroxide, lauroyl peroxide, peroxysuccinic acid, peroxyketal, t-butyl oxyacetate, t-butylperoxy isobutyrate and the like. Among these, dialkyl peroxides which have a one-minute half-life temperature of 170° C. and higher are most preferred, and particularly dicumyl peroxide, t-butylcumyl peroxide, 2,5-dimethyl-2,5-di(t-butylperoxy)hexyne-3, 2,5-dimethyl-2,5-di(t-butylperoxy)hexane, 1,3-bis-(t-butylperoxyisopropyl)benzene and di-t-butyl peroxide may be used either alone or in combinations of two or more to achieve the desired modification rate. For general convenience, these organic peroxides are also provided in the form of blends with various carriers (silica, paraffin oil, water, dioctyl phthalate and the like).

The half-life temperature referred to here is an index of the decomposition rate of the organic peroxide, and it represents the temperature at which one minute is required for the active oxygen content to be reduced by half upon decomposition of the organic peroxide. Measurement of the half-life may be accomplished by dissolving the organic peroxide in benzene to prepare a 0.1 mol/l solution, sealing the organic peroxide solution in a nitrogen-substituted glass tube, and immersing it in a high-temperature tank adjusted to a prescribed temperature for thermal decomposition.

In most cases, an organic peroxide decomposition reaction can be essentially handled as a first-order reaction, and may be represented by the following equations where x is the amount of decomposed peroxide, k is the decomposition rate constant, t is time and a is the initial peroxide concentration.

$$dx/dt = k(a-x) \quad (1)$$

$$\ln(a/(a-x)) = kt \quad (2)$$

Since the half-life is the time until the peroxide concentration is reduced to half the initial concentration by decomposition, the half-life represented by $t_{1/2}$ is determined by substituting a/2 for x.

$$kt_{1/2} = \ln 2 \quad (3)$$

Thus, when thermal decomposition is carried out at a given constant temperature (T) and the time (t) is plotted against $\ln(a/(a-x))$, k may be calculated from the slope of the obtained line and the half-life $t_{1/2}$ at that temperature derived from equation (3). Also, k may be measured at several temperature points, $\ln(t_{1/2})$ then plotted against 1/T and a half-life temperature derived from the line as the decomposition temperature which produces the desired half-life.

Such organic peroxides are preferably added in a range of 0.05 mass % to 5 mass % with respect to 100 mass % of the propylene/α-olefin copolymer. If the organic peroxide content is less than 0.05 mass %, graft modification will not be promoted and a low reactive product will tend to be produced. If it exceeds 5 mass %, molecular cleavage reaction of the propylene/α-olefin copolymer will be promoted, thereby increasing the MFR and tending to reduce the function as a compatibilizer.

The unsaturated carboxylic acid or its derivative used for the invention may be an α,β-unsaturated dicarboxylic acid such as maleic acid, fumaric acid, citraconic acid or itaconic acid or an anhydride thereof, or an unsaturated monocarboxylic acid such as acrylic acid, methacrylic acid, furanic acid, crotonic acid, vinylacetic acid, pentenoic acid or an anhydride thereof. Maleic anhydride is most preferred among these because it can yield copolymers with the most satisfactory physical properties.

These unsaturated carboxylic acids or their derivatives are preferably added in amounts in the range of 0.05 mass % to 10 mass % with respect to 100 mass % of the propylene/α-olefin copolymer. If the amount of addition is less than 0.05 mass % the graft modification rate will tend to be low, making it impossible to achieve the desired physical properties. If the amount of addition is greater than 10 mass %, the proportion of non-grafted free carboxylic acid groups will increase, potentially resulting in an adverse effect on the physical properties.

Finally, the grafting ratio of the unsaturated carboxylic acid or its derivative with respect to the propylene/α-olefin copolymer is preferably in the range of 0.1 mass % to 3 mass %, more preferably 0.5 mass % to 2.5 mass % and even more preferably 0.8 mass % to 2.0 mass %. A grafting ratio of less than 0.1 mass % will not yield the desired adhesive strength and will tend to result in inferior function as a compatibilizer. If the grafting ratio exceeds 3.0 mass %, control of reaction with the adherend will become more difficult, and the MFR will tend to be drastically decreased.

The graft modified propylene/α-olefin copolymer of the invention may be used as an adhesive between a polyolefin-based material and a polar material, or as a compatibilizing dispersing agent for inorganic or organic fillers and thermoplastic resins or a compatibilizer for engineering plastics.

As inorganic fillers there may be mentioned powdered, flat, scaly, needle-like, globular, hollow and filamentous fillers that are publicly known in the prior art, and specifically there may be used powdered fillers such as calcium carbonate, clay, diatomaceous earth, talc, alumina, glass powder, various metal oxides, graphite, silicon carbide, silicon nitride, silica, boron nitride, carbon black and the like, scaly fillers such as mica, glass plates, aluminum flakes and graphite, and filamentous minerals such as glass fibers, carbon fibers, graphite fibers, whiskers, asbestos and wollastonite. As organic fillers there may be mentioned wood dust and organic fibers.

In a flame retardant polyolefin-based resin composition of the invention, the inorganic flame retardant component (b) that provides a flame retardant function is preferably an oxide, hydroxide or carbonate of a metal such as magnesium, aluminum, calcium, potassium or zinc. Preferred among these are magnesium hydroxide and aluminum hydroxide with a mean particle size of no greater than 20 μm and especially a mean particle size of no greater than 10 μm, from the viewpoint of a high flame retardant effect and economy. In order to prevent aggregation of the inorganic flame retardant or to improve dispersibility with the resin component, it is preferred to carry out surface treatment with a fatty acid such as stearic acid, oleic acid or palmitic acid or a metal salt thereof, a wax, organic titanate or an organosilane.

As the polyolefin-based resin (a-1) in a flame retardant polyolefin-based resin composition of the invention there may be mentioned ethylene, propylene, 1-butene, 4-methyl-1-pentene, 1-hexene, 1-octene and 1-dodecene, either alone or as copolymers, ethylene copolymers composed mainly of these α-olefins, or mixtures of the foregoing. Preferred among these are the aforementioned C2-12 α-olefin polymers composed of one or more resin components selected from among (a-1-1) propylene homopolymer, propylene and ethylene random copolymers and propylene/α-olefin block copolymers composed of propylene and ethylene or 1-butene, (a-1-2) low-density polyethylene or ethylene/α-olefin copolymers, (a-1-3) ethylene-vinyl ester copolymers, and (a-1-4) ethylene/α,β-unsaturated alkyl carboxylate ester copolymers.

If the inorganic flame retardant component (b) is added to the polyolefin-based resin component (a) in an amount of less than 50 parts by mass the flame retardant effect will be insufficient, while if it is added at greater than 250 parts by mass the mechanical properties including tensile characteristics will be inadequate. Also, if the amount of the modified polypropylene-based copolymer (a-2) in component (a) is less than 5 mass % the compatibility with the inorganic flame retardant or inorganic filler will be reduced, the reactivity between the inorganic material and polyolefin resin will be poor and the desired physical properties will not be exhibited, while if it is greater than 40 mass % the flow properties will be notably reduced, resulting in lower tensile elongation.

The flame retardant polyolefin-based resin composition of the invention may be obtained by kneading with a publicly known kneading machine such as a single-screw extruder, twin-screw extruder, Banbury mixer, kneader or roll mill, employing a process of pre-blending each of the components with a mixer such as a tumbler mixer or Henschel mixer, or a process of supplying the components in a fixed proportion using a separate metered feeder.

The flame retardant polyolefin-based resin composition of the invention may also contain suitable amounts of various auxiliary components normally included in such compositions, for example, phenol-based, phosphorus-based or sulfur-based antioxidants, coloring agents, nucleating agents, antistatic agents, metal fatty acid salts, amide-based, silicon-based or Teflon™-based lubricants, slip agents, processing aids, metal deactivators, ultraviolet ray inhibitors and the like.

The invention will now be explained in greater detail using examples and comparative examples, with the understanding that the invention is in no way limited in scope by the examples.

A propylene/α-olefin copolymer prepared by the procedure described below was used in the following examples and comparative examples.

Preparation of Propylene/α-Olefin Copolymer

The copolymer was prepared according to the method described in Japanese Unexamined Patent Publication SHO No. 57-61012. Specifically, a catalyst was prepared comprising the reaction product of titanium tetrachloride and ethyl benzoate loaded on a solid component consisting of magnesium chloride and tetraethoxysilane that had been pulverized together, and this catalyst was added, together with hydrogen and a solution of triethylaluminum and ethyl benzoate in propylene, into a 100 L autoclave, the mixture was rapidly heated to 70° C. and kept at that temperature for 10 minutes, and then the autoclave was rapidly cooled to 30° C. and ethylene was added for continued polymerization for 50 minutes. The interior gas was then discharged to complete polymerization and obtain a powder. In this process, the amounts of propylene and ethylene added were adjusted as appropriate to obtain powders having the properties listed in Table 1.

TABLE 1

|  | Multistage polymerized PP copolymer 1 | Multistage polymerized PP copolymer 2 | Multistage polymerized PP copolymer 3 | Multistage polymerized PP copolymer 4 |
| --- | --- | --- | --- | --- |
| Crystal component produced with single-stage polymerization | Homo PP | Random PP | Random PP | Random PP |
| MFR | 0.8 | 0.8 | 0.5 | 9.0 |
| Xylene-soluble portion XS (mass %) | 60 | 60 | 80 | 65 |
| Intrinsic viscosity of xylene-soluble portion (XSIV) | 3.7 | 3.2 | 2.8 | 2.8 |
| Proportion of propylene in xylene-soluble portion (mass %) | 40 | 72 | 75 | 72 |

The properties of block PP and EPR as propylene/α-olefin copolymers prepared by ordinary production processes are shown in Table 2.

TABLE 2

|  | Block PP | EPR |
| --- | --- | --- |
| MFR | 0.3 | 2.9 |
| Xylene-soluble portion XS (mass %) | 17 | 98 |
| Intrinsic viscosity of xylene-soluble portion | 4.5 | 3.3 |
| Proportion of propylene in xylene-soluble portion (mass %) | 47 | 52 |

Note:
Block PP: PB170A by San Aroma Co., Ltd.
EPR: TOUGHMER P-0280 by Mitsui Petroleum Chemical Co., Ltd.

The properties of these polymers were measured in the following manner.

Xylene-Soluble Portion

A 2.5 g portion of resin was dissolved in 250 ml of xylene at 135° C. while stirring. After 20 minutes, the solution was cooled to 25° C. while stirring and then allowed to settle for 30 minutes. The precipitate was filtered out and the filtrate was evaporated under a nitrogen stream, while the residue was vacuum dried at 80° C. to a constant mass. The residue was weighed out and the weight percentage of the xylene-soluble components at 25° C. was determined.

MFR

This was measured at 230° C. under a load of 2.16 kg, according to JIS K 7210.

Copper Sheet Adhesive Property

Each of the sheets (0.2 mm thickness) prepared using the modified polypropylene-based polymers described in the following examples was bonded onto a 2 mm-thick copper sheet by pressing at 230° C., and after cooling it was cut into 15 mm-wide strips. The sheet was then subjected to 180° peeling and the peel strength was measured.

EXAMPLES 1-7

A prescribed amount of maleic anhydride and prescribed amounts of different peroxides as radical initiators were combined with the multistage polymerized propylene/α-olefin copolymers 1-3 prepared by the method described above, and the mixture was blended for 5 minutes with a nitrogen-purged Henschel mixer, after which a 37 mm twin-screw extruder was used for kneading at a set temperature of 230° C. for graft modification.

The maleic acid content of the obtained resin composition was measured directly by infrared absorption spectroscopy (IR), while the composition was separately dissolved in xylene at 135° C. and the solution was precipitated with acetone and repeatedly washed with acetone to remove the free maleic acid, after which the true degree of graft modification was determined by IR.

IR methods are categorized as either dispersed spectrophotometer methods or Fourier transform-type spectrophotometer methods, but Fourier transform-type spectrophotometer methods are preferred because of their higher wavenumber precision.

The grafted carboxylic acid groups were quantified using a Fourier transform-type infrared spectrometer. The measuring sample used was a 0.5±0.1 mm-thick film fabricated by a press molding method, and measurement was conducted with a measurement range of 5000-400 $cm^{-1}$ and absorbance (ABS)=0-2. A tangent was drawn near 4650-3550 $cm^{-1}$, and the peak height A (cm) from the tangent at 4250±2 $cm^{-1}$ was determined. A tangent was also drawn near 1900-1550 $cm^{-1}$, and the peak height B (cm) from the tangent at 1700±2 $cm^{-1}$ and the peak height C (cm) from the tangent at 1792±2 $cm^{-1}$ were determined. Since A represents the carbon chain peak, B represents the closed ring maleic acid peak and C represents the open ring maleic acid peak, the maleic acid graft modification rate in the material can be determined from the following formula.

Maleic acid graft modification rate=(B+C)/A×(constant determined from calibration curve)

The results are shown in Table 3.

COMPARATIVE EXAMPLES 1-4

As comparative examples, prescribed amounts of maleic anhydride and different peroxides were combined with the multistage polymerized propylene/α-olefin copolymers 1 and 4 prepared by the procedure described above and block PP and EPR under the same conditions as in Example 1 or Examples 4-6, and graft modification and modification rate measurement were carried out in the same manner as Examples 1-7. The results of measuring the copper sheet adhesive strength are shown in Table 4.

COMPARATIVE EXAMPLES 6-10

Using the multistage polymerization propylene/α-olefin copolymer 1, prescribed amounts of maleic anhydride and different peroxides were added under different conditions than in Examples 1-7 and graft modification and modification rate measurement were carried out in the same manner as Examples 1-7. The results of measuring the copper sheet adhesive strength are shown in Table 4.

TABLE 3

| | | | Example 1 | Example 2 | Example 3 | Example 4 | Example 5 | Example 6 | Example 7 |
|---|---|---|---|---|---|---|---|---|---|
| Propylene/ α-olefin copolymer | Multistage polymerized PP copolymer 1 | mass % | 100 | 100 | 100 | 100 | | | |
| | Multistage polymerized PP copolymer 2 | mass % | | | | | 100 | | |
| | Multistage polymerized PP copolymer 3 | mass % | | | | | | 100 | 100 |
| | Maleic anhydride | pts. by ms. | 2.0 | 2.5 | 2.5 | 3.0 | 3.0 | 3.0 | 3.0 |
| Radical initiator | 2,5-Dimethyl-2,5-di(t-butylperoxy)hexane | pts. by ms. | 0.4 | 0.15 | | 0.4 | 0.4 | 0.4 | 0.15 |
| | Di-t-butylperoxide | pts. by ms. | | 0.35 | 0.4 | | | | 0.35 |
| Material physical properties | Measured maleic acid weight (before washing) | % | 1.3 | 1.5 | 1.3 | 1.6 | 1.2 | 1.8 | 1.9 |
| | Maleic acid modification rate (after washing) | % | 1.0 | 1.2 | 1.1 | 1.2 | 1.0 | 1.2 | 1.4 |
| | MFR | g/10 min | 6 | 4.5 | 4 | 5 | 32 | 52 | 50 |
| | Copper sheet adhesive strength | gf/15 mm | Broken at base | Broken at base | Broken at base | Broken at base | Broken at base | Broken at base | Broken at base |
| No. | | | | (a-2-1) | | | (a-2-2) | | (a-2-3) |

TABLE 4

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|
| Propylene/ α-olefin copolymer | Multistage polymerized PP copolymer 1 | mass % | | | | | 100 | 100 | 100 | 100 | 100 | 100 |
| | Multistage polymerized PP copolymer 4 | mass % | 100 | 100 | | | | | | | | |
| | Block PP | mass % | | | 100 | | | | | | | |
| | EPR | mass % | | | | 100 | | | | | | |
| | Maleic anhydride | pts. by ms. | 2.0 | 3.0 | 3.0 | 3.0 | 3.0 | 3.0 | 0.04 | 11.0 | 3.0 | 3.0 |
| Radical initiator | 2,5-Dimethyl-2,5-di(t-butylperoxy)hexane | pts. by ms. | 0.4 | 0.4 | 0.4 | 0.4 | | | 0.4 | 0.4 | 0.04 | 6 |
| | Lauroyl peroxide | pts. by ms. | | | | | 0.4 | | | | | |
| | Benzoyl peroxide | pts. by ms. | | | | | | 0.4 | | | | |
| Material physical properties | Measured maleic acid weight (before washing) | % | 0.8 | 0.9 | 0.7 | 0.9 | 0.6 | 0.7 | 0.02 | 3.8 | 1.7 | 1.2 |
| | Maleic acid modification rate (after washing) | % | 0.6 | 0.7 | 0.4 | 0.7 | 0.4 | 0.5 | 0 | 1.2 | 0.2 | 0.8 |
| | MFR | g/10 min | 60 | 80 | 70 | 40 | 0.5 | 0.6 | 9 | 7 | 1.5 | 150 |
| | Copper sheet adhesive strength | gf/15 mm | 1500 | 1800 | 600 | 1600 | 300 | 600 | 0 | Broken at base | 250 | 1800 |
| No. | | | | (a-2-4) | (a-2-5) | (a-2-6) | | | | | | |

In comparing Examples 1-7 and Comparative Examples 1-10 shown in Tables 3 and 4, the actual grafted maleic acid modification rate was 1.0 mass % or greater for maleic acid modification of the propylene/α-olefin copolymers of the invention in Examples 1-7. In addition, since the copper sheet adhesion was satisfactory and the materials did not peel from the copper sheet at 180° peeling but instead were destroyed, they were indicated as "broken at base". Particularly in Examples 1-4 in which multistage polymerization PP copolymer 1 was modified, the MFR after modification was kept to below 10 g/10 min, and therefore the materials were suitable for use as compatibilizers.

In Comparative Examples 1-4 which used propylene/α-olefin copolymers outside of the scope of the invention, and in Comparative Examples 5-10 which used maleic acid contents and peroxides outside of the scope of the invention, the maleic acid modification rate was poor and the copper sheet adhesive strength was also inadequate. When maleic anhydride was added in an amount exceeding the scope of the invention in Comparative Example 8, the adhesive strength was sufficient but the residual unreacted maleic acid produced severe yellowish brown discoloration and a notable residual odor of maleic acid, indicating that it could not withstand practical use.

EXAMPLES 8-15, COMPARATIVE EXAMPLES 11-15

Flame retardant polyolefin-based resin compositions were prepared by combining the modified propylene/α-olefin copolymers (a-2) obtained in Examples 1-7 and Comparative Examples 1-10, polyolefin-based resins (a-1) and inorganic flame retardants (b).

(a-1) Polyolefin-Based Resins
PP1: Homopolypropylene (HOMO)PS 201A (MFR: 0.5 g/10 min) by San Aroma Co., Ltd.
PP2: Block polypropylene (HECO)PB170A (MFR: 0.3 g/10 min, xylene-soluble portion: 17 mass % by SunAllomer Ltd.)

(b) Inorganic Flame Retardants (All With Mean Particle Sizes of 0.8 μm)
Magnesium hydroxide $(Mg(OH)_2)$ 1: KISUMA 5A, fatty acid surface-treated product by Kyowa Chemical Industry Co., Ltd.
Magnesium hydroxide $(Mg(OH)_2)$ 2: KISUMA 5P, silane coupling agent surface-treated product by Kyowa Chemical Industry Co., Ltd.

Components (a-1), (a-2) and (b) were appropriately combined by the material preparation method described below to obtain the compositions listed in Tables 5 and 6 as Examples 8-15 and Comparative Examples 11-15.

TABLE 5

| Type | | | Example 8 | Example 9 | Example 10 | Example 11 | Example 12 | Example 13 | Example 14 | Example 15 | Example 16 | Example 17 | Example 18 |
|---|---|---|---|---|---|---|---|---|---|---|---|---|---|
| (a-1-1) | PP1 HOMO | mass % | 90 | 90 | 90 | | | | | | | | |
| (a-1-2) | PP2 HECO | mass % | | | | 90 | 90 | 90 | 90 | 85 | 90 | 90 | 90 |
| (a-2-1) | Modified multistage polymerized PP copolymer 1 | mass % | 10 | | | 10 | | | 10 | 15 | 10 | | |
| (a-2-2) | Modified multistage polymerized PP copolymer 2 | mass % | | 10 | | | 10 | | | | | 10 | |
| (a-2-3) | Modified multistage polymerized PP copolymer 3 | mass % | | | 10 | | | 10 | | | | | 10 |
| (a-2-4) | Modified multistage polymerized PP copolymer 4 | mass % | | | | | | | | | | | |
| (a-2-5) | Modified block PP | mass % | | | | | | | | | | | |
| (a-2-6) | Modified EPR | mass % | | | | | | | | | | | |
| (b-1) | $Mg(OH)_2$ 1: Fatty acid surface-treated | Pts. by ms. | 70 | 70 | 70 | 70 | 70 | 70 | | | | | |
| (b-2) | $Mg(OH)_2$ 2: Silane surface-treated | Pts. by ms. | | | | | | | 70 | 70 | 200 | 200 | 200 |
| Material physical properties | Tensile strength | MPa | 26 | 28 | 23 | 27 | 27 | 21 | 31 | 30 | 16 | 14 | 13 |
| | Tensile elongation | % | 320 | 380 | 450 | 380 | 430 | 680 | 400 | 370 | 120 | 140 | 150 |
| | Young's modulus | MPa | 1500 | 1200 | 950 | 1350 | 1050 | 790 | 1450 | 1350 | 1630 | 1480 | 1250 |
| | Abrasion resistance (3N load) | Strokes | 240 | 210 | 140 | 220 | 180 | 110 | 270 | 280 | — | — | — |
| | Abrasion resistance (1N load) | Strokes | — | — | — | — | — | — | — | — | 175 | 140 | 105 |
| | Flame retardance (45°) | — | good | good | good | good | good | good | good | good | — | — | — |
| | Flame retardance (vertical) | — | — | — | — | — | — | — | — | — | V-0 | V-0 | V-0 |
| | Heat deformation | % | 3.2 | 3.8 | 5.2 | 3.5 | 3.7 | 5.5 | 3.3 | 3.2 | 6.8 | 8.2 | 9.5 |

TABLE 6

| Type | | | Comp. Ex. 11 | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|---|
| (a-1-1) | PP1 HOMO | mass % | 90 | 90 | 90 | | | | |
| (a-1-2) | PP2 HECO | mass % | | | | 96 | 59 | 90 | 90 |
| (a-2-1) | Modified multistage polymerized PP copolymer 1 | mass % | | | | 4 | 41 | 10 | 10 |
| (a-2-2) | Modified multistage polymerized PP copolymer 2 | mass % | | | | | | | |
| (a-2-3) | Modified multistage polymerized PP copolymer 3 | mass % | | | | | | | |
| (a-2-4) | Modified multistage polymerized PP copolymer 4 | mass % | 10 | | | | | | |
| (a-2-5) | Modified block PP | mass % | | 10 | | | | | |
| (a-2-6) | Modified EPR | mass % | | | 10 | | | | |
| (b-1) | Mg(OH)$_2$ 1: Fatty acid surface-treated | pts. by ms. | 70 | 70 | 70 | | | | |
| (b-2) | Mg(OH)$_2$ 2: Silane surface-treated | pts. by ms. | | | | 70 | 70 | 45 | 260 |
| Material physical properties | Tensile strength | MPa | 25 | 31 | 19 | 32 | High resin pressure < Production impossible | 33 | 12 |
| | Tensile elongation | % | 360 | 250 | 600 | 300 | | 650 | 10 |
| | Young's modulus | MPa | 1150 | 1850 | 620 | 1580 | | 750 | 2100 |
| | Abrasion resistance (3N load) | Strokes | 115 | 190 | 70 | 105 | | 120 | — |
| | Abrasion resistance (1N load) | Strokes | — | — | — | — | | — | 60 |
| | Flame retardance (45°) | | — | good | poor | good | poor | poor | — |
| | Flame retardance (vertical) | | — | — | — | — | — | — | V-0 |
| | Heat deformation | % | 4.6 | 2.7 | 8.2 | 3.1 | | 7.8 | 4.2 |
| | Comment | | Unsuitable as modifier | Unsuitable as modifier | Unsuitable as modifier | Low Mah | Excess Mah | Low flame retardant | Excess flame retardant |

Note:
Math: Maleic acid modification

Material Preparation Method

The materials of components (a-1), (a-2) and (b) were mixed with a 20 liter-volume Henschel mixer, and then a φ40 mm codirectional twin-screw extruder was used for kneading with the die temperature set to 200° C., to prepare pellets. A 200 mm-wide T-die mounted on the end of a φ20 mm extruder was then used to fabricate 0.2 mm-thick and 1.0 mm-thick sheets at a molding temperature of 230° C. and a take-off speed of 2.0 m/min.

Each of the obtained sheets was subjected to a tensile test and to various physical property tests for abrasion resistance, flame retardance and heat deformation as shown in Table 5. The data in the direction of flow of the T-die were used as the results for the tensile test.

The measuring methods for each property are explained below.

Tensile Test

A 0.2 mm-thick sheet of each composition listed in Table 5 was punched in the flow direction using a #3 dumbbell according to JIS K 6251, and a tensile test was conducted at ordinary temperature with a cross head speed of 200 mm/min, a chuck distance $l_0$ of 60 mm and a gauge length $L_0$ of 20 mm. The strength upon breakage of the test piece divided by the minimum cross-sectional area was recorded as the tensile strength, the gauge length at that time was recorded as L and the tensile elongation was calculated as $(L-L_0)/L_0 \times 100$.

The Young's modulus E was determined by drawing the straight tangent from the start of the displacement-stress curve (FIG. 1), and calculating $E = \Delta\sigma/\Delta\epsilon$ ($\Delta\sigma$: difference in stress based on mean cross-sectional areas between two points on the line, $\Delta\epsilon$: difference in strain between the same two points).

The elongation percentage λa up to the yield point was represented as $\lambda a = l_1/l_0 \times 100$, reading the elongation $l_1$ from the stress-strain curve (FIG. 1) up to the yield point, as obtained in the tensile test.

Abrasion Resistance

Figure 2:
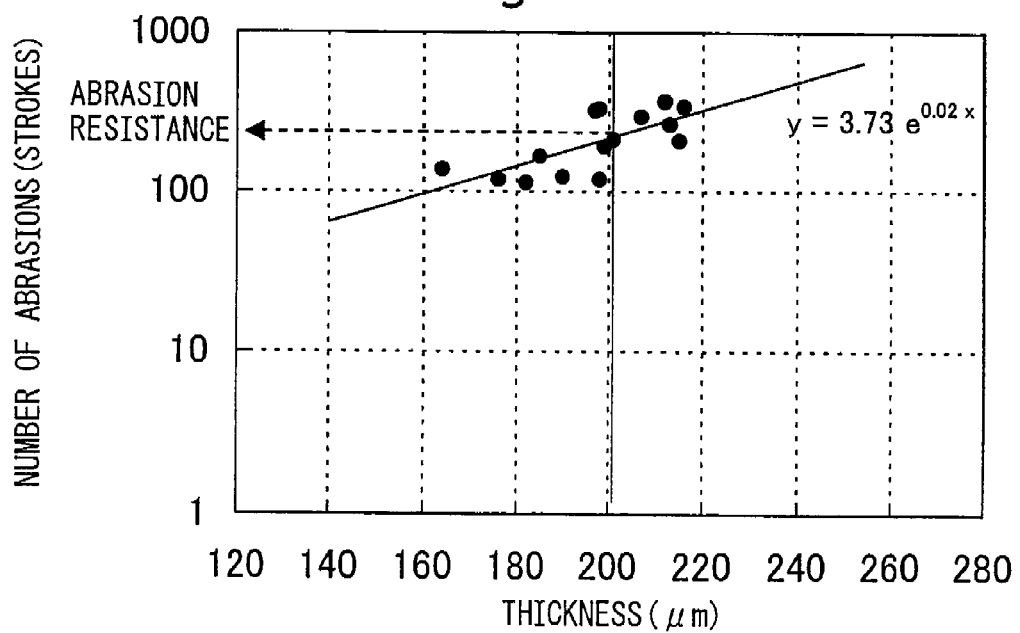
FIG. 2 is a graph showing abrasion resistance for the abrasion test of the examples.

The blade stroke method described in JASO D611-12-(2) was used for an abrasion test using φ0.45 mm piano wire as the blade, and a load of 3N. A sheet with a thickness of about 0.2 mm prepared in the manner described above for use as a sample was wound around an anchored φ1.4 mm metal rod and firmly affixed thereto, and the blade was stroked 20 times for each sample to a point contacting the metal rod, after which each sheet thickness and the number of abrasions were plotted on a semilogarithmic graph, determining the abrasion resistance at 0.2 mm thickness by the least-square method and recording that value as the abrasion resistance (FIG. 2).

Combustion Test

Of the aforementioned fabricated 1.0 mm-thick sheets, those with an inorganic flame retardant content of no greater than 70 parts by mass were subjected to a 45° combustion test according to JIS C 3005, and those whose flames were extinguished within 70 seconds were judged as satisfactory.

Those with an inorganic flame retardant content of 200 parts by mass or greater were measured by the UL-94 vertical flame test according to JIS K 7106.

Heat Deformation Test

Measurement was conducted according to JIS C 3005. The test conditions were 100° C., 3 kgf load.

In the comparison between Examples 8-18 and Comparative Examples 11-18 listed in Tables 5 and 6, the flame-retardant material of Comparative Example 11 employing the modified multistage polymerized PP copolymer 4 with inferior adhesive strength exhibited poor abrasion resistance compared to the materials of Examples 8-10. This was attributed to inferior adhesive force at the interface between the Mg(OH)$_2$ flame retardant and the resin. Similarly, Comparative Example 12 which employed modified block PP and Comparative Example 13 which employed modified EPR also tended to exhibit a poor level of abrasion resistance for their hardness (Young's modulus).

With Comparative Example 14 wherein the modified propylene/α-olefin copolymer of the invention was present at less than the prescribed amount, not only was the abrasion resistance poor compared to Example 11, but a reduction in flame retardance was also observed, suggesting that diffusion of Mg(OH)$_2$ was insufficient.

Also, with Comparative Example 15 wherein the modified propylene/α-olefin copolymer of the invention was present at greater than the prescribed amount, the resin pressure was too high to permit extrusion molding, and it was therefore impossible to evaluate.

Comparative Example 16 wherein the flame retardant content was less than the prescribed amount had improved tensile elongation and strength but poor flame retardance, while Comparative Example 17 wherein the flame retardant content was greater than the prescribed amount had a significantly reduced tensile elongation percentage.

INDUSTRIAL APPLICABILITY

The modified polypropylene-based copolymer of the invention has a high degree of grafting of unsaturated carboxylic acids and their derivatives, as well as low variation in melt flow rate before and after graft modification, and can therefore exhibit excellent adhesive strength for polar materials. In addition, when the copolymer is used as a compatibilizer in combination with an olefin-based resin material and an inorganic filler, it can yield materials with excellent flame retardance, abrasion resistance, tensile strength and tensile elongation, as well as flexibility and heat resistance. It can therefore be utilized as an adhesive agent and applied in fields such as electrical wiring, wallpaper, flooring materials and construction films, which require high flame retardance to be imparted to polypropylene-based resins.

The invention claimed is:

1. A modified polypropylene-based polymer obtained by graft modification of a propylene/α-olefin copolymer, wherein the propylene/α-olefin copolymer is polymerized in a multi stage process, the propylene/α-olefin copolymer having a xylene-soluble portion of at least 40 mass % and no greater than 85 mass %, a xylene-soluble portion (XS) intrinsic viscosity (XSIV) of at least 2.5 dl/g, and an MFR value of no greater than 3.0 g/10 min at 230° C. under a load of 2.16 kg, using, with respect to 100 parts by mass of the propylene/α-olefin copolymer, 2.0 to 3.0 parts by mass of an unsaturated carboxylic acid or its derivative and 0.4 to 0.5 parts by mass of a dialkyl peroxide;

wherein the propylene/α-olefin copolymer has (i) an elastomer component having a mean particle size of no greater than 5 μm and (ii) a component comprising polypropylene;

wherein the grafting ratio of the unsaturated carboxylic acid, or its derivative, to the propylene/α-olefin copolymer is 1.0 mass % to 1.4 mass %; and wherein the elastomer component forms an inter penetrating network structure with the polypropylene.

2. A modified polypropylene-based polymer according to claim 1, wherein the dialkyl peroxide has a half-life temperature of at least 170° C. and is used as the radical initiator for graft modification.

3. A flame retardant polyolefin-based resin composition which is a composition comprising a polyolefin-based resin component (a) and an inorganic flame retardant component (b), wherein component (a) comprises 60-95 mass % of a polyolefin-based resin (a-1) and 40-5 mass % of a modified polypropylene-based polymer (a-2) according to claim 1, component (b) comprises an inorganic metal hydrate and/or an inorganic filler, and the amount of component (b) is at least 50 parts by mass and no greater than 250 parts by mass with respect to 100 parts by mass of component (a).

4. A flame retardant polyolefin-based resin composition which is a composition comprising a polyolefin-based resin component (a) and an inorganic flame retardant component (b), wherein component (a) comprises 60-95 mass % of a polyolefin-based resin (a-1) and 40-5 mass % of a modified polypropylene-based polymer (a-2) according to claim 2, component (b) comprises an inorganic metal hydrate and/or an inorganic filler, and the amount of component (b) is at least 50 parts by mass and no greater than 250 parts by mass with respect to 100 parts by mass of component (a).

* * * * *